E. H. HARVEY.
PROCESS OF MODIFYING STARCH.
APPLICATION FILED MAY 13, 1920.
1,366,653.
Patented Jan. 25, 1921.
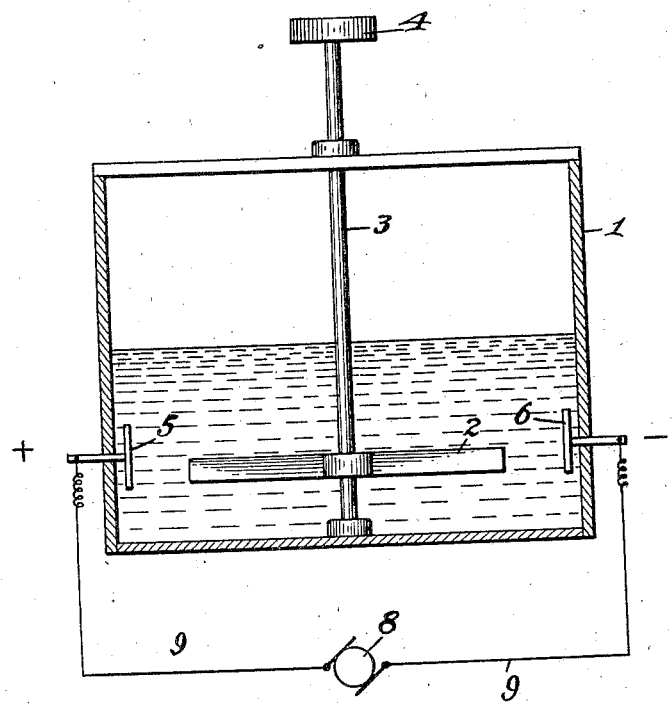
Ellery H. Harvey Inventor
By his Attorney
Gorham Crosby

UNITED STATES PATENT OFFICE.

ELLERY H. HARVEY, OF LANSDALE, PENNSYLVANIA, ASSIGNOR TO PERKINS GLUE COMPANY, A CORPORATION OF PENNSYLVANIA.

PROCESS OF MODIFYING STARCH.

1,366,653.

Specification of Letters Patent. Patented Jan. 25, 1921.

Application filed May 13, 1920. Serial No. 380,983.

*To all whom it may concern:*

Be it known that I, ELLERY H. HARVEY, a citizen of the United States, and resident of Lansdale, in the county of Montgomery and State of Pennsylvania, have invented certain new and useful Improvements in Processes of Modifying Starch, of which the following is a specification.

My invention relates to improvements in processes of modifying or converting starch. Heretofore it has been common to modify or convert starch for various purposes by treating the same with various chemicals such as certain acids or alkalis. The starch may be modified or converted in this way to produce soluble starch, dextrin, etc., and if the treatment is only carried a short way, the starch may be converted only to a relatively slight extent so as to produce a starch base suitable for making vegetable wood veneer glue such as described in Reissue Letters Patent 13436 dated July 2, 1912.

According to the present invention instead of modifying or converting the starch by means of chemical reagents as heretofore done, I employ the action of electrolysis for this purpose, and prefer to stop the action before the conversion or modification has passed the soluble starch stage. I have found that if an electric current is passed through a liquid suspension of the starch in water, it apparently modifies or converts the starch to produce various starch conversion products. In converting the starch electrically or electrolytically I prefer to mix the starch with water to form a liquid suspension of the starch in water and while the bath is being agitated the current is passed therethrough, the strength of current and time depending upon the nature and kind of starch used and the degree of conversion desired. I preferably add to the suspension of starch in water a slight amount of acid in order to make the bath substantially conducting for the electric current although in some cases ordinary water may be used which contains as impurities sufficient salts or alkaline or acid bodies to render the bath sufficiently conducting. The conversion is carried out at substantially atmospheric pressure and substantially at atmospheric or room temperature and I preferably stop the action before any large part of the starch has been converted to soluble starch so that it will be suitable as a base for making wood veneer glue as described in said Reissue Patent 13436.

As one specific example of converting so-called raw starch to increase its solubility and decrease its viscosity to make a base for the making of a veneer glue according to said Reissue Letters Patent 13436, I placed in a circular wooden tank like that shown in the accompanying drawing, which forms a part of this specification, a mixture of 6000 pounds of so-called raw cassava starch having a relatively high viscosity, and 24,000 pounds of water and added to the bath two liters of hydrochloric acid of 28% strength. The tank 1 was provided with an agitator 2 secured to a spindle 3 driven by pulley 4 so as to keep the bath in continuous agitation. The agitator 2 was arranged so that one arm tended to force the liquid upwardly and the other arm tended to force it downwardly. I provided in the bath 2, iron electrodes 5 and 6 connected to a suitable source of electrical energy indicated at 8 by suitable conductors 9. The electrodes 5 and 6 may be made of iron plates about two feet square, but since the iron may be slightly attacked, carbon electrodes may be used if desired. The voltage used was about 110 volts and I found that after a direct current of about $3\frac{1}{2}$ amperes had been passed through the bath while being continuously agitated, for about one hour, the starch had been suitably converted or degenerated for making glue as described in said Reissue Letters Patent 13436. The tank used was about sixteen feet in diameter. The small amount of hydrochloric acid was added merely to make the bath sufficiently conducting. It will be understood, however, that any other chemicals suitable for making the water bath sufficiently conducting may be used, such as sulfuric acid or other acids, alkalis or salts. However, only a very small quantity is needed and no such quantity is required as would ordinarily be used to convert the starch if the conversion was carried out purely by chemical action. By the use of suitable electrolyte, the starch may be easily converted into soluble starch and so on. Thus the process lends itself directly to the production of many kinds of starch products of varying degrees of solubility or viscosity, and the conversion of the starch may be stopped at any point desired by discontinuing the current and allowing the starch to settle and draining off the liquid and then washing the starch and drying the same. If desired, the very small amount of acid or alkali used may be neutralized. The liquid drawn off may also be used as electrolyte for another batch. It will also be understood that the strength of current used and the time of treatment will depend upon the kind and nature of starch used and conversion desired. Apparently the action of the current causes a tearing apart or splitting up of the aggregates of starchy matter within the starch granule whereby the starch becomes more easily soluble in water or caustic soda solutions or soluble in the same caustic soda solution to produce a less viscous solution, but unless the treatment is carried very far as beyond the soluble starch stage the starch will still retain the general size and form of granule as when originally introduced. I find that my method is particularly adapted to the degeneration of starch for the making of a glue base for making veneer glue as described in said reissued Letters Patent 13436 and the conversion of the starch is accomplished in a very much shorter time than if it was done by the use of chemicals merely, and also without the use of any substantial amount of expensive chemicals. Furthermore according to my method not only may the conversion be quickly accomplished, but it is easily stopped at any desired point by turning off the current. Although I have described my improvements in great detail and with respect to preferred embodiments, I do not desire to be limited to such details or embodiments since many changes may be made and the invention embodied in widely different forms without departing from the spirit and scope of the invention in its broader aspects.

What I claim as new and desire to secure by Letters Patent, is:

1. The improved process of producing modified or converted starch which consists in passing an electric current through an electrically conducting bath containing the starch to modify or convert the starch whereby it will dissolve in caustic soda solutions to produce less viscous solutions and stopping the action before the starch has passed the soluble starch stage.

2. The improved process of modifying or converting starch which consists in electrolyzing the starch substantially at atmospheric pressure and temperature until the desired modification or conversion of the starch is obtained by electrolysis.

3. The improved process of modifying or converting starch which consists in passing an electric current through a liquid suspension of the starch in water at substantially atmospheric pressure until the desired modification or conversion of the starch is obtained by electrolysis.

4. The improved process of modifying or converting starch which consists in passing an electric current through a liquid suspension of the starch in water at substantially atmospheric pressure to modify or convert the starch whereby it will dissolve in caustic soda solutions to produce less viscous solutions and stopping the action before the starch has passed the soluble starch stage.

5. The improved process of modifying or converting starch which consists in passing an electric current through a liquid suspension of the starch in water at substantially atmospheric pressure to modify or convert the starch whereby it will dissolve in caustic soda solutions to produce less viscous solutions and stopping the conversion or modification before any large part of the starch has been converted to soluble starch.

6. The process of modifying or converting starch which consists in electrolyzing the starch at substantially atmospheric pressure, to convert or modify the starch.

Signed at Lansdale in the county of Montgomery and State of Pennsylvania this eleventh day of May A. D. 1920.

ELLERY H. HARVEY.